United States Patent
Megerle et al.

[11] Patent Number: 5,931,179
[45] Date of Patent: Aug. 3, 1999

[54] HYDRAULIC UNIT, PARTICULARLY FOR A SLIP-CONTROLLED VEHICLE BRAKE SYSTEM AND PROCESS FOR THE PRODUCTION THEREOF

[75] Inventors: Friedrich Megerle, Sonthofen; Guenther Schnalzger, Blaichach; Martin Kirschner, Rettenberg, all of Germany

[73] Assignee: Robert Bosch GmbH, Stuttgart, Germany

[21] Appl. No.: 09/051,848

[22] PCT Filed: Jul. 25, 1996

[86] PCT No.: PCT/DE96/01372

§ 371 Date: Apr. 22, 1998

§ 102(e) Date: Apr. 22, 1998

[87] PCT Pub. No.: WO97/16335

PCT Pub. Date: May 9, 1997

[30] Foreign Application Priority Data

Oct. 27, 1995 [DE] Germany ............... 195 40 040

[51] Int. Cl.$^6$ ................................. F16K 27/02
[52] U.S. Cl. .................. 137/15; 137/315; 137/454.2
[58] Field of Search .................. 137/454.2, 454.6, 137/315, 15

[56] References Cited

U.S. PATENT DOCUMENTS

| | | | |
|---|---|---|---|
| 3,865,140 | 2/1975 | Greenwood | 137/625.64 |
| 4,624,282 | 11/1986 | Fargo | 251/129.1 X |
| 4,961,444 | 10/1990 | Morgan et al. | 137/315 |
| 5,346,176 | 9/1994 | Fujimoto et al. | 137/454.2 X |
| 5,364,067 | 11/1994 | Linkner, Jr. | 137/454.2 X |
| 5,439,279 | 8/1995 | Linkner, Jr. et al. | 137/454.2 X |
| 5,681,097 | 10/1997 | Tackett et al. | 137/454.2 X |
| 5,778,918 | 7/1998 | McLelland | 137/315 X |

FOREIGN PATENT DOCUMENTS

| | | | |
|---|---|---|---|
| A-4030571 | 4/1992 | Germany | F15B 13/044 |
| A-4332538 | 3/1995 | Germany | B60T 8/36 |

Primary Examiner—Stephen M. Hepperle
Assistant Examiner—John Bastianelli
Attorney, Agent, or Firm—Edwin E. Greigg; Ronald E. Greigg

[57] ABSTRACT

The invention relates to a hydraulic unit with a solenoid valve inserted into a receiving bore of a hydraulic block. With rigid fastening, the solenoid valve can rest under pressure against a circumference point of the receiving bore and when there is alternating stress on the solenoid valve during operation, the solenoid valve displaces material of the hydraulic block. In order to prevent this, a fastening device with a securing ring caulked in the receiving bore, includes a collar that is deformed into a circumferential groove of the solenoid valve leaving radial play.

10 Claims, 3 Drawing Sheets

HYDRAULIC UNIT, PARTICULARLY FOR A SLIP-CONTROLLED VEHICLE BRAKE SYSTEM AND PROCESS FOR THE PRODUCTION THEREOF

PRIOR ART

The invention is based on a hydraulic unit for a slip-controlled brake system of a motor vehicle.

A hydraulic unit of this kind has been disclosed, for example, in DE 43 32 538 A1. The known hydraulic unit has a hydraulic block with a receiving bore for a solenoid valve into which a solenoid valve is inserted with its hydraulic part. By means of conduits that feed into the receiving bore, the solenoid valve is hydraulically connected to other hydraulic components of the motor vehicle brake system, which are also partially contained in the hydraulic block and otherwise are disposed externally and connected to the hydraulic block with fluid lines. To fasten the solenoid valve in the receiving bore, material of the hydraulic block in the mouth region of the receiving bore is caulked in an overlapping manner to a flange of the solenoid valve. In this way, the solenoid valve is rigidly held in the receiving bore. After the caulking, a hollow cylindrical magnet coil for actuating the solenoid valve is slid onto a magnet part of the solenoid valve protruding from the hydraulic block.

As a result of small deviations from the ideal position of the solenoid valve in the receiving bore when caulking and as a result of the caulking, the solenoid valve can press against a circumference wall of the receiving bore on the inside of the receiving bore. As a result of alternating stress on the solenoid valve due to fluctuating fluid pressure during the operation of the hydraulic unit, a material displacement occurs at the point at which the solenoid valve presses against the circumference wall, the solenoid valve "digs into the circumference wall of the receiving bore". Diametrically opposite the point at which the solenoid valve displaces material of the hydraulic block, a radial gap between the solenoid valve and the circumference wall of the receiving bore enlarges, wherein the increase of the radial play can become a multiple of the original diametrical play between the solenoid valve and the receiving bore at this point. A sealing cup, which creates a seal between an inlet side and an outlet side of the solenoid valve, can plastically flow ("extrude") into the enlarged radial gap, which leads to a failure of the sealing cup and thereby of the solenoid valve.

ADVANTAGES OF THE INVENTION

The solenoid valve of the hydraulic unit according to the invention is held in the receiving bore of the hydraulic block with radial play and/or with pivoting play in relation to a longitudinal axis of the receiving bore. As a result, installation errors in the attachment of the solenoid valve in the receiving bore are prevented. The solenoid valve is prevented from pressing against the circumference wall of the receiving bore and also, a material displacement does not take place when there is alternating stress. The size of the radial gap of the solenoid valve in the receiving bore remains permanently limited to a manufacture value at which a sealing cup or another sealing element does not extrude into the radial gap. Assembly tolerances to be maintained are greater and assembly waste due to caulking of the solenoid valve in a position in which it presses against the circumference wall of the receiving bore is virtually eliminated.

In addition, the solenoid valve can have play in the axial direction in the receiving bore.

In a preferred embodiment of the invention, the solenoid valve is secured in the receiving bore by means of a securing ring that is slid onto it, which is affixed, for example, by the caulking of material belonging to the hydraulic block in the mouth region of the receiving bore and which engages an annular shoulder face of the solenoid valve and secures the solenoid valve in the axial direction with a positive fit in the receiving bore, wherein radial play is produced between the securing ring and the solenoid valve.

In one embodiment of the invention, the securing ring has a hollow cylindrical collar, which is plastically deformed into a circumferential groove of the solenoid valve and as a result, engages behind a groove cheek face of the solenoid valve oriented toward the hydraulic block. In this manner, the securing ring is fixed to the solenoid valve before its installation and limits the solenoid valve's axial play after it is fastened in the receiving bore.

BRIEF DESCRIPTION OF DRAWINGS

The invention will be explained in detail below in conjunction with an exemplary embodiment represented in the drawings.

DESCRIPTION OF THE EXEMPLARY EMBODIMENT

Figure 1:
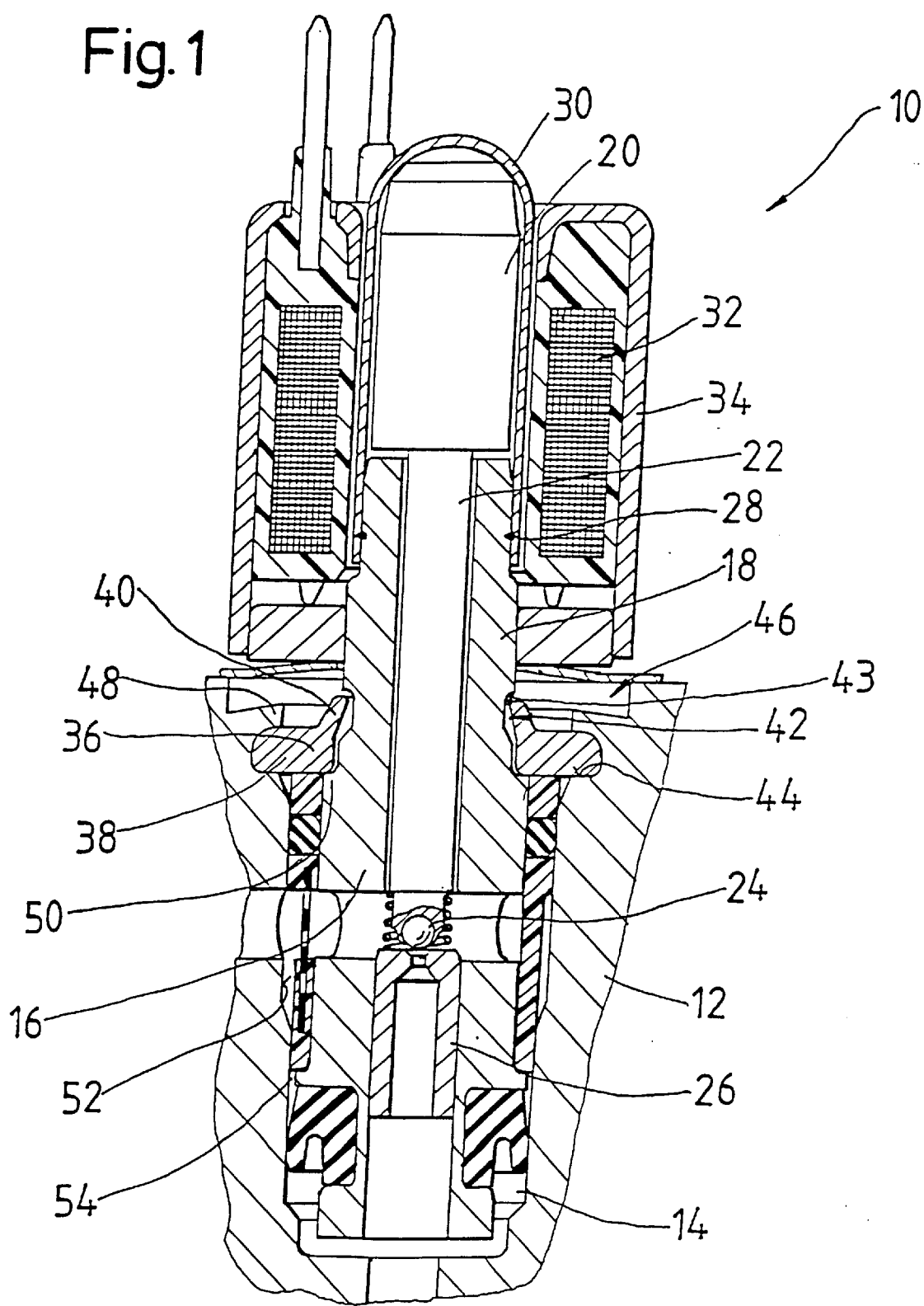
FIG. 1 shows a section through a hydraulic unit according to the invention, in the region of a solenoid valve, FIGS. 2 and 4 each show a forming die, and FIGS. 3 and 5 schematically show the attachment of a securing ring to a valve housing.

FIG. 1 shows a hydraulic unit 10 according to the invention, with a hydraulic block 12 which contains a receiving bore 14 for a solenoid valve 16. The hydraulic unit 10 is provided for use in a slip-controlled motor vehicle brake system. The hydraulic block 12 is used for hydraulically connecting hydraulic components of the brake system. Usually a number of solenoid valves are accommodated in rows next to one another in the hydraulic block 12, as well as other hydraulic components such as piston pumps, storage chambers, and damping chambers, of which only one solenoid valve 16 is shown in FIG. 1.

The solenoid valve 16 is disposed with a hydraulic part in the receiving bore 14 of the hydraulic block 12 and a magnetic actuating part of the solenoid valve 16 protrudes out from the hydraulic block 12.

The solenoid valve 16 includes a hollow cylindrical valve housing 18, an armature 20 on an end face of the valve housing 18, from which an armature rod 22 fixed to the armature extends into the valve housing 18, in whose free end face a ball is press-fitted as a valve closing body 24. The valve closing body 24 cooperates with a valve seat part 26 that has a valve seat, which part is press-fitted in the valve housing 18 from an end face opposite the armature 20. The armature 20 is disposed in a valve dome 30 that is slid onto the valve housing 18 and is connected to the valve housing by means of a weld 28. A hollow cylindrical coil 32 for actuating the solenoid valve 16 is slid onto the valve dome 30 and is accommodated in a coil housing 34. The coil 32 with the coil housing 34 is first slid onto the solenoid valve 16 after it is fastened in the hydraulic block 12, which will be described below. Since solenoid valves 16 of the type used here are known to one skilled in the art in a large number of embodiments, the details of the solenoid valve 16 are not gone into further here.

A securing ring 36, which encloses the valve housing 18 is used to fasten the solenoid valve 16 in the receiving bore 14 of the hydraulic block 12. The securing ring 36 is inserted with its flange 38 into an annular step 44 in the region of a mouth 46 of the receiving bore 14 and is connected to the hydraulic block 12 by the caulking of material 48 belonging to the hydraulic block 12. It has a stable flange 38, which is of one piece with a conical collar 40 that has a narrow wall thickness. In order to secure the solenoid valve 16 in the receiving bore 14, an annular shoulder 50 is provided on the valve housing 18 which the securing ring 36 engages with positive fit in the axial direction. The collar 40 protrudes from the flange 38 in the direction of the magnetic actuating part of the solenoid valve 16, which part projects out of the receiving bore 14 of the hydraulic block 12. The collar 40 is plastically deformed radially inward into a circumferential groove 42 in the valve housing 18 and engages behind its groove cheek face 43 oriented toward the hydraulic block 12 and as a result, limits an axial mobility of the solenoid valve 16 in the receiving bore 14. There is play in the radial and axial direction between the securing ring 36 and the solenoid valve 16.

In this manner, the solenoid valve 16 is prevented from pressing against the circumference wall 52 of the receiving bore 14 and as a result, an alternating stress that occurs due to pressure fluctuations of hydraulic fluid, which the solenoid valve 16 is exposed to, displaces the normally softer material of the hydraulic block 12 at the pressure point and "digs into" the circumference wall 52 of the receiving bore 14. By fastening the solenoid valve 16 in the receiving bore 14 with radial play, the invention prevents this kind of "digging into" the circumference wall 52 at a circumference point and an attendant enlargement of a radial gap 54 between the solenoid valve 16 and the receiving bore 14 on the side opposite the pressure point during the operation of the solenoid valve 16. The radial gap 54 continuously retains its original size.

Figure 2:
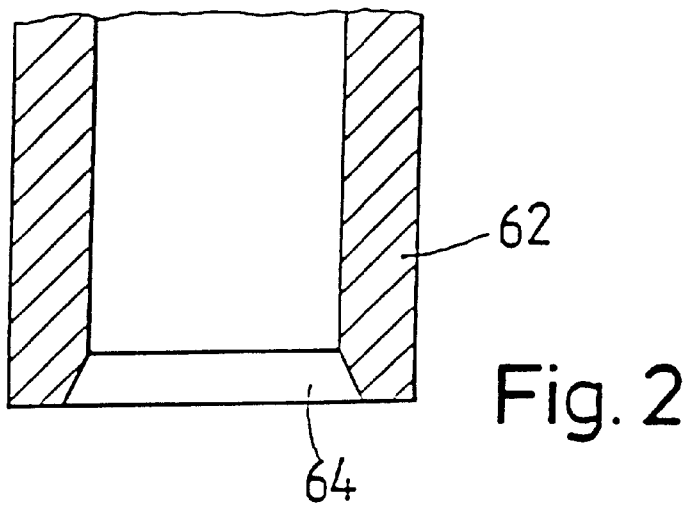
Figure 3:
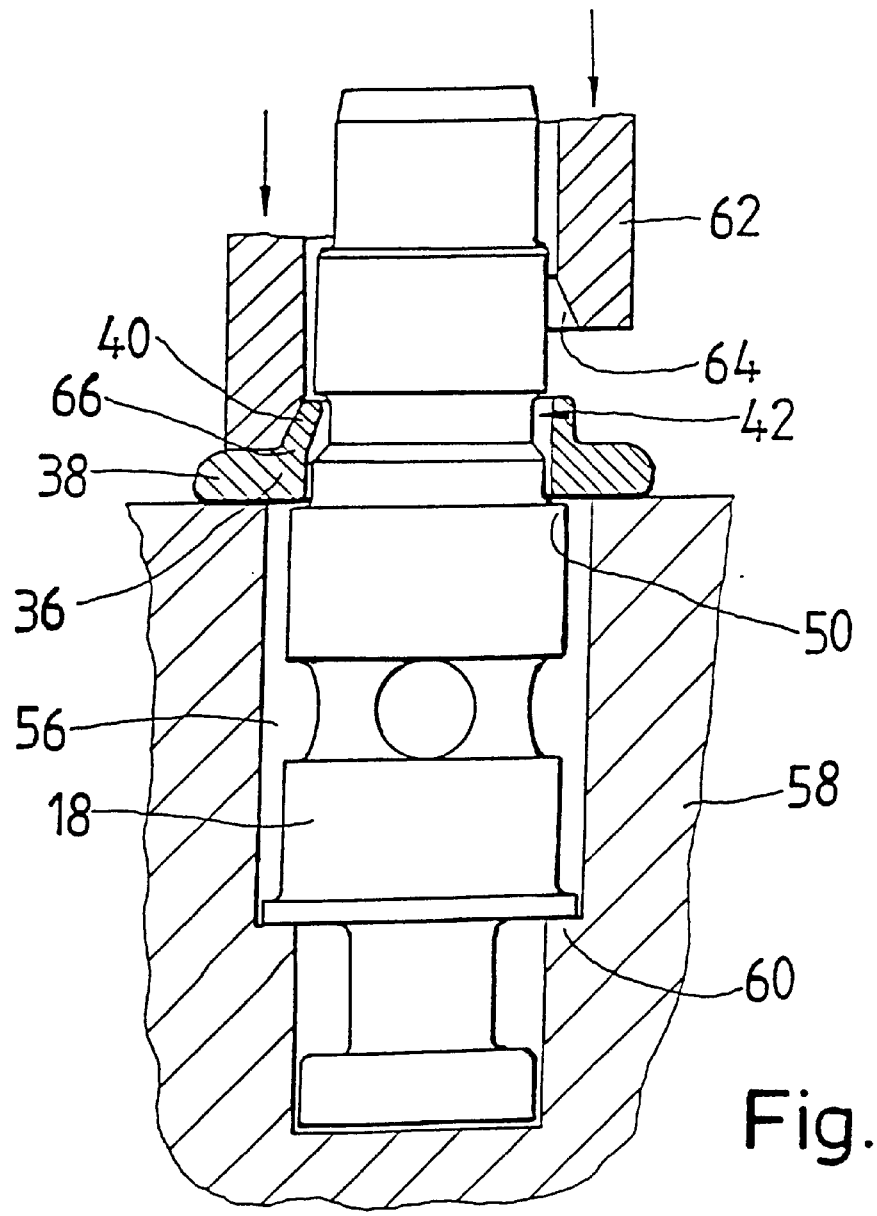

The attachment of the securing ring 36 to the valve housing 18 is represented in FIG. 3: The valve housing 18 is inserted into a bore 56 of a counter support 58, wherein it rests on an annular step 60 of the counter support 58. The securing ring 36 is slid onto the valve housing 18 and rests with its flange 38 on the counter support 58. It is not supported against the annular shoulder 50 of the valve housing. After the valve housing 18 is inserted into the counter support 58 and the securing ring 36 is slid onto the valve housing 18, a hollow cylindrical forming die 62, which is shown in detail in FIG. 2, is lowered over the valve housing 36 (right half of FIG. 3). The forming die 62 has an inner forming cone 64 at its mouth, which cone widens in the direction of the securing ring 36 and plastically forms the collar 40 of the securing ring 36, which collar is hollow and cylindrical before the forming, radially inward into a cone (left half of FIG. 3).

The forming die 62 is pressed downward until it strikes against the flange 38 of the securing ring 36. As a result of its resting on the counter support 58, the force for pressing down the forming die 62 is absorbed by the counter support 58 and is not introduced into the valve housing 18. The diameter of the forming cone 64 is chosen so that it forms the collar 40 of the securing ring 36 into the groove 42 of the valve housing 18 leaving radial play. The valve housing 18 is secured in the securing ring 36 with play in the radial and axial direction. A significant reduction of the wall thickness of the securing ring 36 from its stable flange 38 to the collar 40 produces a circumferential set bending point 66 at the transition from the flange 38 to the collar 40. The flange 38 is not deformed when the securing ring 36 is attached to the valve housing 18.

Figure 5:
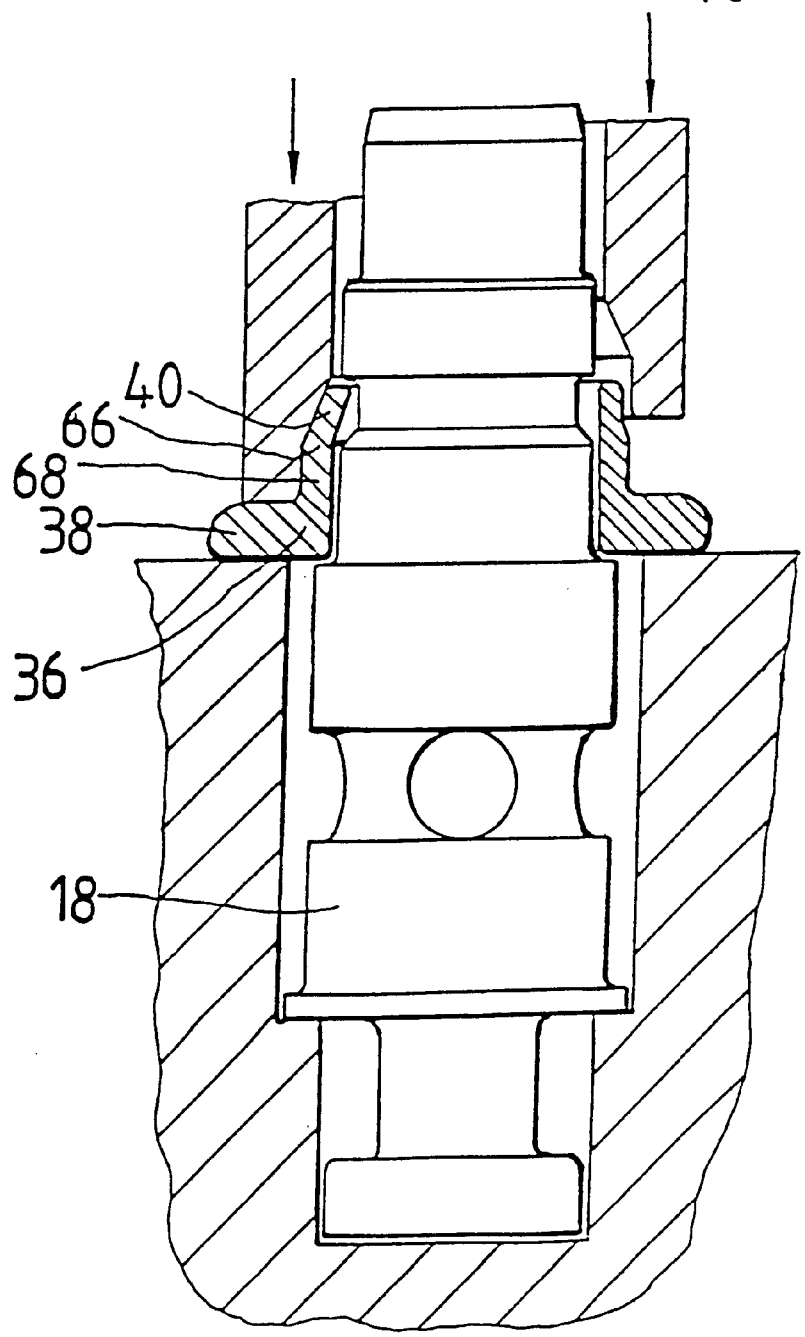

FIG. 5 shows a modified securing ring 36. In this securing ring 36, a hollow cylindrical section 68 is disposed between the flange 38 and the collar 40, which is not deformed in the forming of the collar 40. In this embodiment as well, the wall thickness of the securing ring 36 reduces at the transition from the hollow cylindrical section 68, which is not intended to be deformed, to the collar 40, which is intended to be plastically deformed, to form a circumferential set bending point 66, in order to achieve a definite deforming of only the collar 40.

Figure 4:
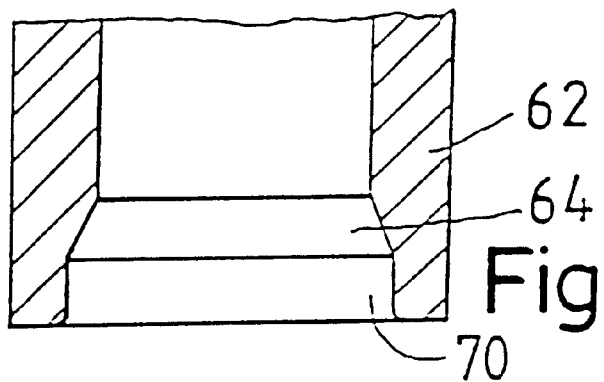

The forming die 62 (FIG. 4) has an internal cylinder section 70 for the securing ring 36 shown in FIG. 5, which extends the forming die 62 beyond the forming cone 64 and which guides the forming die 62 at the hollow cylindrical section 68 of the securing ring 36. In this manner, the guidance of the forming die 62 is improved, but due to the hollow cylindrical section 68 disposed between the collar 40 and the flange 38, the length of the securing ring 36 in the axial direction is longer than in the embodiment of the invention shown in FIGS. 1 and 3.

The foregoing relates to preferred exemplary embodiments of the invention, it being understood that other variants and embodiments thereof are possible within the spirit and scope of the invention, the latter being defined by the appended claims.

We claim:

1. A hydraulic unit with a hydraulic block that comprise a receiving bore, a solenoid valve is inserted into said receiving bore, a valve fastening device (36) is affixed to the hydraulic block (12), said valve fastening device secures the solenoid valve (16) in the receiving bore (14) with play in the radial direction and/or with pivoting play.

2. A hydraulic unit according to claim 1, in which the valve fastening device (36) secures the solenoid valve (16) in the receiving bore (14) with play in the axial direction.

3. A hydraulic unit according to claim 1, in which the valve fastening device has a securing ring (36) which is affixed to the hydraulic block (12), said securing ring encloses the solenoid valve (16), and engages the solenoid valve (16) with a positive fit in the axial direction.

4. A hydraulic unit according to claim 3, in which the securing ring (36) is fastened to the hydraulic block (12) by caulking in a mouth region (46) of the receiving bore (14).

5. A hydraulic unit according to claim 3, in which the securing ring (36) has a collar (40) that is plastically deformed radially inward, which engages behind a face (43) of the solenoid valve (16) oriented toward the hydraulic block (12).

6. A hydraulic unit according to claim 5, in which the securing ring (36) is embodied as thinner at the transition (66) to the collar (40) or in the entire collar region.

7. A hydraulic unit according to claim 6, in which a wall thickness of the securing ring (36) is reduced at the transition to the collar (40) or in the entire collar region.

8. A process of securing a solenoid valve in a receiving bore in a hydraulic block of the solenoid valve, which comprises forming a circumferential groove with a shoulder (50) in a circumferential wall of a valve housing (18), forming an annular step (44) in said hydraulic block near a mouth of said valve housing, inserting said valve housing into said bore (14) of said hydraulic block, slipping a securing ring onto said valve housing, fixing said securing ring on said annular step in said hydraulic block and on said shoulder in said valve housing (18), deforming the mouth of said hydraulic block to secure said securing ring to said hydraulic block, and deforming a collar of the securing ring (36) plastically inwards in a radial direction thereby forcing a portion of said securing ring into said circumferential groove in the circumference of said valve housing to secure said valve housing to said bore.

9. A process according to claim 8, which comprises deforming a diameter of a forming cone (64) to match said collar (40) of said securing ring (36) subsequent to deforming said collar (40), producing a definite radial play between the collar (40) and the valve housing (18).

10. The process according to claim 8 which comprises deforming the collar of the securing ring (36) by a forming cone and limiting an axial motion of the forming cone (64) by means of a flange (38) of the securing ring (36).

* * * * *